(12) United States Patent
You et al.

(10) Patent No.: US 8,969,727 B2
(45) Date of Patent: Mar. 3, 2015

(54) BATTERY MODULE

(71) Applicants: Samsung SDI Co., Ltd., Yongin-si, Gyeonggi-do (KR); Robert Bosch GmbH, Stuttgart (DE)

(72) Inventors: Tai-Sun You, Yongin-si (KR); Jang-Hyun Song, Yongin-si (KR); Yong-Sam Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/756,668

(22) Filed: Feb. 1, 2013

(65) Prior Publication Data

US 2013/0269978 A1    Oct. 17, 2013

(30) Foreign Application Priority Data

Apr. 12, 2012   (KR) .................... 10-2012-0037998

(51) Int. Cl.
*H01M 2/20*   (2006.01)
*H01B 1/02*   (2006.01)
*H01M 2/10*   (2006.01)
*H01M 2/30*   (2006.01)

(52) U.S. Cl.
CPC ............ *H01B 1/02* (2013.01); *H01M 2/202* (2013.01); *H01M 2/206* (2013.01); *H01M 2/1077* (2013.01); *H01M 2/305* (2013.01)
USPC .......................................... 174/126.1; 429/90

(58) Field of Classification Search
USPC ............... 174/126.1; 429/121, 122, 123, 170, 429/178, 152, 211, 90, 158
See application file for complete search history.

(56) References Cited

U.S. PATENT DOCUMENTS

| | | | |
|---|---|---|---|
| 2010/0081048 A1* | 4/2010 | Nansaka et al. | 429/158 |
| 2011/0117420 A1* | 5/2011 | Kim et al. | 429/158 |
| 2011/0189535 A1 | 8/2011 | Kim et al. | |
| 2013/0252046 A1* | 9/2013 | Zhao | 429/90 |

FOREIGN PATENT DOCUMENTS

| | | |
|---|---|---|
| JP | 05-55457 U | 7/1993 |
| KR | 10-2011-0089962 A | 8/2011 |

\* cited by examiner

*Primary Examiner* — Mark F Huff
*Assistant Examiner* — Monique Wills
(74) *Attorney, Agent, or Firm* — Lee & Morse, P.C.

(57) ABSTRACT

A battery module including a plurality of rechargeable batteries each having terminals; and a connection member electrically connecting terminals of neighboring ones of the rechargeable batteries, wherein the connection member includes a terminal hole into which one of the terminals is inserted, and a mounting portion that protrudes inwardly at the terminal hole, and wherein each terminal includes a support portion contacting the mounting portion and supporting the mounting portion.

13 Claims, 4 Drawing Sheets

BATTERY MODULE

CROSS-REFERENCE TO RELATED APPLICATION

This application claims priority to and the benefit of Korean Patent Application No. 10-2012-0037998 filed in the Korean Intellectual Property Office on Apr. 12, 2012, the entire contents of which are incorporated herein by reference.

BACKGROUND

1. Field

Embodiments relate to a battery module.

2. Description of the Related Art

A rechargeable battery may be recharged and discharged. A small-capacity rechargeable battery may be used for small portable electronic devices, e.g., mobile phones, notebook computers, camcorders, or the like. A large-capacity rechargeable battery may be used as a motor-driving power source for, e.g., a hybrid vehicle or the like.

A high-output rechargeable battery using a non-aqueous electrolyte of high energy density has been developed. A plurality of high-output rechargeable batteries may be connected in series to prepare a large-capacity battery module for driving a motor of a device, e.g., an electric automobile or the like, that requires much power.

A single large-capacity rechargeable battery may include a plurality of rechargeable batteries connected in series. Such rechargeable batteries may have, e.g., a cylindrical shape, an angular or hexahedral shape, or the like.

A square-shaped, e.g., hexahedral, rechargeable battery may include an electrode assembly (in which a positive electrode plate and a negative electrode plate are positioned with a separator interposed therebetween), a case (having a space for accommodating the electrode assembly), a cap plate (hermetically sealing the case and having a terminal hole in which a terminal is inserted), and a terminal (electrically connected with the electrode assembly and protruding from an outer surface of the case).

SUMMARY

Embodiments are directed to a battery module.

The embodiments may be realized by providing a battery module including a plurality of rechargeable batteries each having terminals; and a connection member electrically connecting terminals of neighboring ones of the rechargeable batteries, wherein the connection member includes a terminal hole into which one of the terminals is inserted, and a mounting portion that protrudes inwardly at the terminal hole, and wherein each terminal includes a support portion contacting the mounting portion and supporting the mounting portion.

The terminals may include a first terminal including a first material and a second terminal including a second material.

The connection member may include a first connection bar formed of the first material, the first connection bar being connected to the first terminal; and a second connection bar formed of the second material, the second connection bar being connected to the second terminal.

The first material may include aluminum.

The second material may include copper.

The first material and second material may be different materials.

The terminal hole may have a lower end that is wider than an upper end thereof.

The mounting portion may gradually protrude further inwardly toward an upper portion thereof.

The mounting portion may have an inner surface that is sloped with respect to an upper surface of the connection member, and a surface of the support portion contacting the inner surface of the mounting portion may be sloped.

The support portion may have a stepped recess, and the mounting portion may include a stepped protrusion protruding from an inner side of the terminal hole, a lower surface of the mounting portion contacting an upper surface of the support portion.

The battery module may further include a nut on each of the terminals, the connection member being spaced apart from the nut.

The support portion may include an outwardly protruded support projection at an upper portion thereof, the support protrusion contacting an upper surface of the mounting portion.

An upper surface of the connection member may be coplanar with an upper surface of each of the terminals.

The battery module may further include a welding portion at a junction of each of the terminals and an upper end of the terminal hole.

The battery module may further include a welding portion at a junction of each of the terminals and an upper corner of the terminal hole.

BRIEF DESCRIPTION OF THE DRAWINGS

Features will become apparent to those of ordinary skill in the arty by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of regions may be exaggerated for clarity of illustration. It will also be understood that when an element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
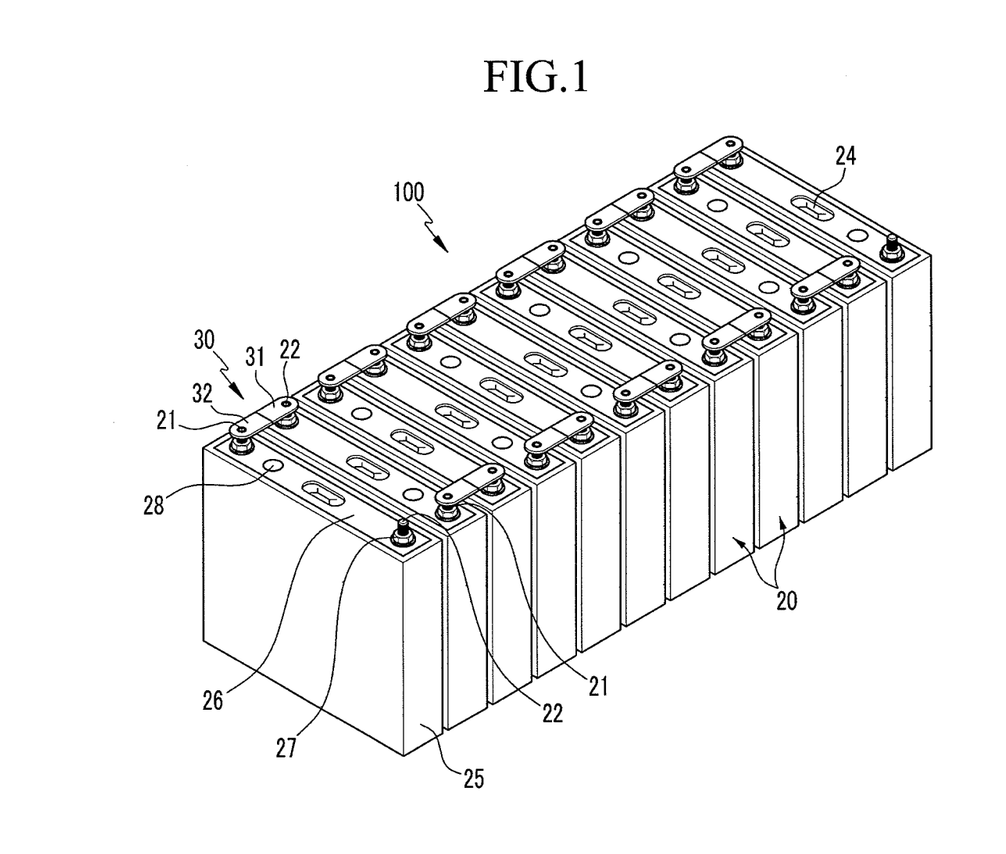
FIG. 1 illustrates a perspective view of a battery module according to an embodiment.
Figure 2:
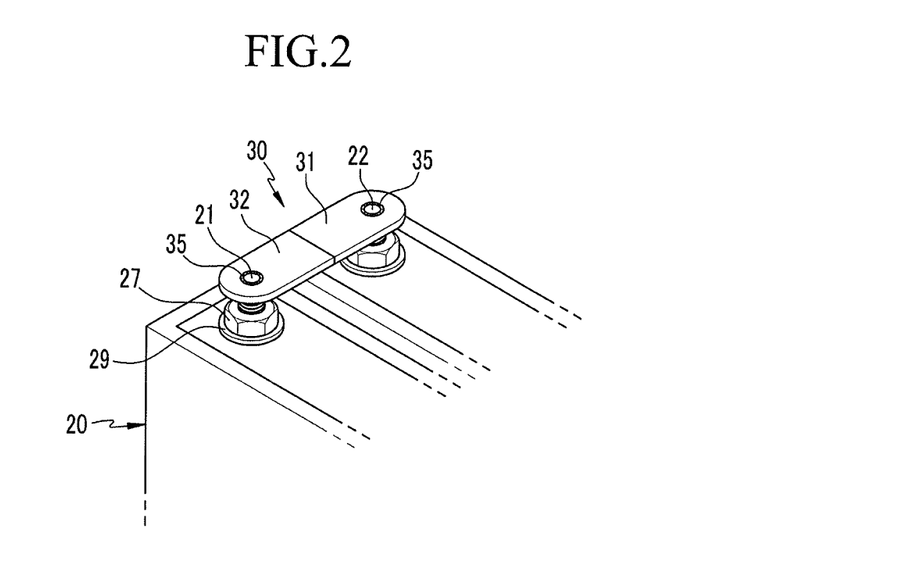
FIG. 2 illustrates a perspective view showing a portion of the battery module of FIG. 1.

FIG. 1 illustrates a perspective view of a battery module according to an embodiment. FIG. 2 illustrates a perspective view showing a portion of the battery module of FIG. 1.

Referring to FIGS. 1 and 2, a battery module 100 according to the present embodiment may include a plurality of rechargeable batteries 20 (each including a positive electrode terminal 21 and a negative electrode terminal 22) and a connection member 30 (electrically connecting the rechargeable batteries 20).

The battery module 100 may be formed by, e.g., connecting the rechargeable batteries 20 in series. However, the embodiments are not limited thereto and, in an implementation, the rechargeable batteries 20 may be connected in parallel.

The rechargeable batteries 20 may have a square, i.e., prismatic or hexahedral, shape. The rechargeable batteries 20 may include a case 25, a cap plate 26 (coupled to the case 25 at an opening in the case 25), and the positive electrode terminal 21 and a negative electrode terminal 22 (outwardly protruding from the case 25). The rechargeable batteries having a square shape are described as an example, but the embodiments are not limited thereto, and the rechargeable batteries may have a cylindrical shape or any other suitable shapes.

A vent member 24 (that opens when an internal pressure of the rechargeable battery 20 exceeds a predetermined pressure) and a sealing stopper 28 (hermetically sealing an electrolyte injection opening) may be installed on the cap plate 26.

The terminals 21 and 22 may be installed on the cap plate 26 such that the terminals 21 and 22 protrude at an outer side of the cap plate 26. A gasket 29 may be installed between the cap plate 26 and the terminals 21 and 22 for the purpose of insulation and sealing.

The positive electrode terminal 21 may have a column shape and may be electrically connected to a positive electrode of an electrode assembly (not illustrated) insertedly positioned in the case 25. An outer circumference of the positive electrode terminal 21 may be threaded, and a nut 27 may be fastened to the positive electrode terminal 21 to support the positive electrode terminal 21, e.g., at an upper or lower side. The negative electrode terminal 22 may have a column shape and may be electrically connected to a negative electrode of the electrode assembly that is insertedly positioned in the case 25. An outer circumference of the negative electrode terminal 22 may be threaded, and another nut 27 may be fastened to the negative electrode terminal 21 to support the negative electrode terminal 22 at an upper or lower side.

In an implementation, the positive electrode terminal 21 may be made of aluminum and the negative electrode terminal 222 may be made of copper.

The rechargeable batteries 20 (arranged in parallel) may be connected in series by the connection members 30. In this case, in a state in which the rechargeable batteries 20 are disposed such that the positive electrode terminals 21 and the negative electrode terminals 22 of neighboring rechargeable batteries are crisscrossed, the connection member 30 is joined to the positive electrode terminal 21 of one rechargeable battery 20 and the negative electrode terminal 22 of a neighboring rechargeable battery 20 through welding.

Figure 3:
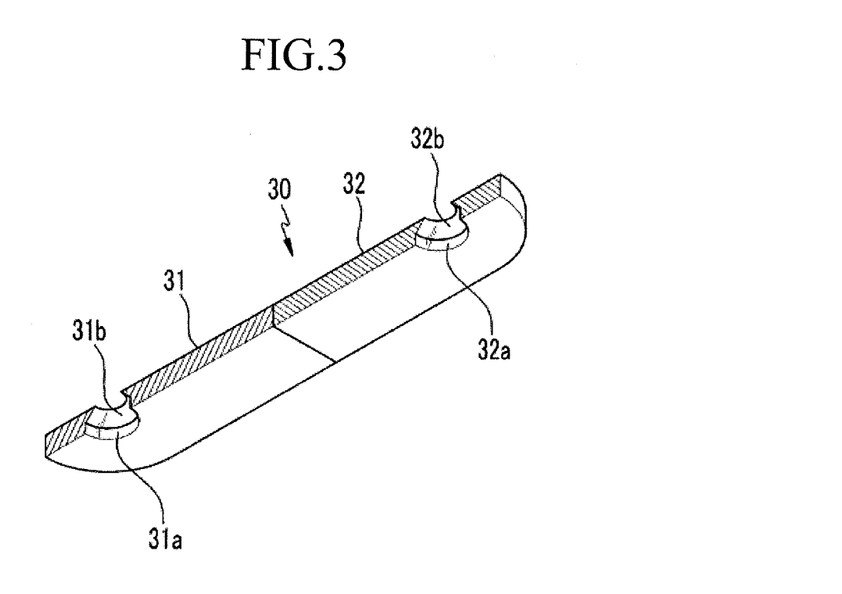
FIG. 3 illustrates a cut perspective view showing a connection member of the battery module of FIG. 1.
Figure 4:
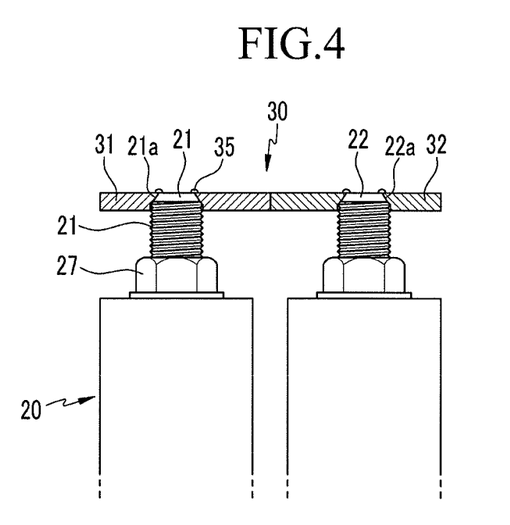
FIG. 4 illustrates a cross-sectional view showing a portion of the battery module of FIG. 1.

FIG. 3 illustrates a cut perspective view showing a connection member of the battery module of FIG. 1. FIG. 4 illustrates a cross-sectional view showing a portion of the battery module of FIG. 1.

Referring to FIGS. 3 and 4, the connection member 30 may have a plate shape. In a state in which the positive electrode terminal 21 and the negative electrode terminal 22 are insertedly installed in the connection member 30, the connection member 30 may be joined or coupled with the positive electrode terminal 21 and the negative electrode terminal 22 through welding.

The connection member 30 may include a first connection bar 31 and a second connection bar 32. The first connection bar 31 may be joined to or coupled with the second connection bar 32. The first connection bar 31 may be made of a material different from that of the second connection bar 32.

In an implementation, the first connection bar 31 may be made of the same material as that of the positive electrode terminal 31, e.g., aluminum, and the second connection bar 32 may be made of the same material as that of the negative electrode terminal 22, e.g., copper. The first connection bar 31 may be fixed to the positive electrode terminal 21 through welding, and the second connection bar 32 may be fixed to the negative electrode terminal 22 through welding.

The first connection bar 31 and the second connection bar 32 may be joined, e.g., by having a clad metal structure or through friction stir welding.

The first connection bar 31 may include a terminal hole 31a, into or through which the positive electrode terminal 21 may be inserted. A mounting portion 31b may protrude inwardly in the terminal hole 31a. The mounting portion 31b may be disposed at an upper end of the terminal hole 31a. Accordingly, a lower end of the terminal hole 31a may be wider than an upper end thereof.

An inner surface of the mounting portion 31b may be sloped with respect to an upper surface of the connection member 30. For example, the mounting portion 31b may gradually protrude further in an inward direction from an outer edge of the terminal hole 31a at an upper portion of the terminal hole 31a. Thus, an inner diameter of the terminal hole 31a may be gradually reduced toward the upper portion thereof, due to the presence of the mounting portion 31b.

The positive electrode terminal 21 may include a support portion 21a at an upper portion thereof. The support portion 21a may contact the mounting portion 31b, e.g., an inner surface of the mounting portion 31b, to support the mounting portion 31b. The support portion 21a may have a truncated circular cone shape, e.g., may have a sloped lateral surface. The support portion 21a may have a diameter that is gradually reduced toward an upper portion thereof. The sloped surface of the support portion 21a may have a same slope angle as that of the inner surface of the mounting portion 31b, so the mounting portion 31b and the support portion 21a may be tightly coupled or attached. For example, the support portion 21a may have a shape that is complementary to a shape of the mounting portion 31b.

The second connection bar 32 may include a terminal hole 32a, into or through which the negative electrode terminal 22 may be inserted. A mounting portion 32b may protrude inwardly in the terminal hole 32a. The mounting portion 32b may be disposed at an upper portion of the terminal hole 32a. Accordingly, a lower end of the terminal hole 32a may be wider than an upper end thereof.

An inner surface of the mounting portion 32b may be sloped with respect to an upper surface of the connection member 30. For example, the mounting portion 32b may gradually protrude further in an inward direction from an outer edge of the terminal hole 32a at an upper portion of the terminal hole 32a. Thus, an inner diameter of the terminal hole 32a may be gradually reduced toward the upper portion thereof, due to the presence of the mounting portion 32b.

The negative electrode terminal 22 may include a support portion 22a at an upper portion thereof. The support portion 22a may contact the mounting portion 32b, e.g., an inner surface of the mounting portion 32b, to support the mounting portion 32b. The support portion 22a may have a truncated circular cone shape, e.g., may have a sloped lateral surface. The support portion 22a may have a diameter that is gradually reduced toward an upper portion thereof. The sloped surface of the support portion 22a may have a same slope angle as that of the inner surface of the mounting portion 32b, so the mounting portion 32b and the support portion 22a may be tightly coupled or attached. For example, the support portion 22a may have a shape that is complementary to that of the mounting portion 32b.

The connection member 30 may be supported by the support portions 21a and 22a on the upper portions of the terminals 21 and 22 so as to be spaced apart from the nuts 27 respectively disposed at a lower portion of the terminals 21 and 22.

In an implementation, an upper surface of the connection member 30 and upper surfaces of the terminals 21 and 22 may be coplanar. A welding portion 35 may join the terminals 21 and 22 and the connection member 30 along upper corners of the terminal holes 31a and 32a. The welding portion 35 may be formed through various methods, e.g., arc welding, ultrasonic welding, resistance welding, or the like.

As described above, the mounting portions 31b and 32b and the support portions 21a and 22a may be in contact with one another to support the connection member 30. Thus, in a state in which the connection member 30 is mounted on the terminals 21 and 22, the connection member 30 and the terminals 21 and 22 may be easily welded. In addition, the first connection bar 31 (welded to the positive electrode terminal 21) may be made of the same material as that of the positive electrode terminal 21, and the second connection bar 32 (welded to the negative electrode terminal 22) may be made of the same material as that of the negative electrode terminal 22. Thus, corrosion (that may otherwise occur in the case of welding heterogeneous materials) may be reduced and/or prevented, and the like materials may be easily joined through welding.

Also, the support portions 21a and 22a may be inserted into the connection member 30 to support the connection member 30. Thus, a phenomenon in which the connection member 30 is shaken by external impact or vibration to damage the welding portion 35 may be reduced and/or prevented. For example, the sloped inner surfaces of the mounting portions 31b and 32b and the sloped outer surfaces of the support portions 21a and 22a may be in contact with one another to thereby support the connection member 30. Thus, a tight coupling or attachment of the mounting portions 31b and 32b and the support portions 21a and 22a may be facilitated by pressing the connection member 30, thereby forming a strong joint that is resistant to vibration.

Figure 5:
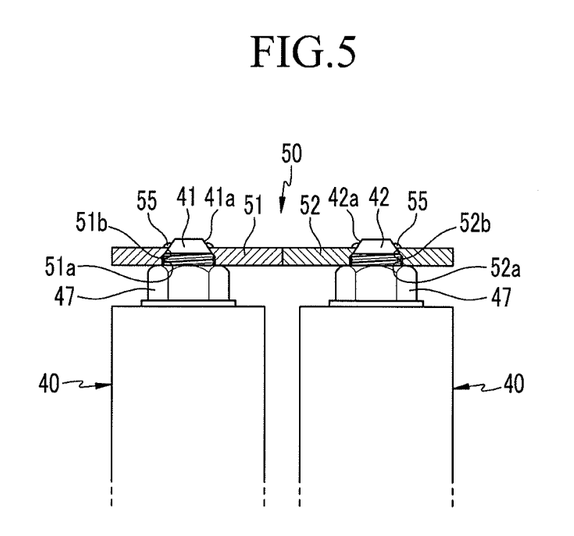
FIG. 5 illustrates a cross-sectional view showing a portion of a battery module according to an embodiment.

FIG. 5 illustrates a cross-sectional view showing a connection member according to an embodiment.

Referring to FIG. 5, a battery module according to the present embodiment has the same structure as that of the previous embodiment, except for a shape of terminals and a connection member. Accordingly, a repeated description of the same structure and elements may be omitted.

The battery module according to the present embodiment may include a plurality of rechargeable batteries 40 (each having a positive electrode terminal 41 and a negative electrode terminal 42) and a connection member 50 (electrically connecting the rechargeable batteries 40).

Outer circumferences of the positive electrode terminal 41 and the negative electrode terminal 42 may be threaded, and nuts 47 may be respectively installed on the positive electrode terminal 41 and the negative electrode terminal 42 to support the positive electrode terminal 41 and the negative electrode terminal 42 at upper or lower portions thereof.

The connection member 50 may have, e.g., a plate shape. In a state in which the positive electrode terminal 41 and the negative electrode terminal 42 are insertedly installed therein, the connection member 50 may be joined thereto through welding.

The connection member 50 may include a first connection bar 51 joined to or coupled with a second connection bar 52. The first connection bar 51 may be made of a material different from that of the second connection bar 52.

In an implementation, the first connection bar 51 may be made of the same material as that of the positive electrode terminal 41, e.g., aluminum, and the second connection bar 52 may be made of the same material as that of the negative electrode terminal 42, e.g., copper. The first connection bar 51 may be fixed to the positive electrode terminal 41 through welding, and the second connection bar 52 may be fixed to the negative electrode terminal 42 through welding.

The first connection bar 51 and the second connection bar 52 may be joined, e.g., by having a clad metal structure or through friction stir welding.

The first connection bar 51 may include a terminal hole 51a, into or through which the positive electrode terminal 21 may be inserted. A mounting portion 51b may protrude inwardly, e.g., to an interior of the terminal hole 51a. The mounting portion 51b may be disposed at an upper portion of the terminal hole 51a. The positive electrode terminal 41 may include a support portion 41a at an upper portion thereof. The support portion 41a may contact the mounting portion 51b, e.g., an inner surface of the mounting portion 51b, to support the mounting portion 51b. For example, the support portion 41a may have a shape that is complementary to a shape of the mounting portion 51b.

The second connection bar 52 may include a terminal hole 52a, into or through which the negative electrode terminal 42 may be inserted. A mounting portion 52b may protrude inwardly in the terminal hole 52a. The mounting portion 52b may be disposed at an upper portion or end of the terminal hole 52a. A support portion 42a may be disposed at an upper portion or end of the negative electrode terminal 42. The support portion 42a may contact an inner surface of the mounting portion 52b to support the mounting portion 52b. For example, the support portion 42a may have a shape that is complementary to a shape of the mounting portion 52b.

The connection member 50 may be supported by the support portions 41a and 42a formed at an upper portion of the terminals 41 and 42 and may contact the nuts 47 respectively disposed at a lower portion of the terminals 41 and 42.

The support portions 41a and 42a may protrude further than the connection member 50 such that upper surfaces of the terminals 41 and 42 are higher than the upper surface of the connection member 50. Upper ends of the terminal holes 51a and 52a may contact the lateral surfaces of the support portions 41a and 42a. A welding portion 55 may join or couple corners of the terminal holes 51a and 52a and lateral surfaces of the support portions 41a and 42a.

As described above, the mounting portions 51b and 52b and the support portions 41a and 42a may contact one another to thereby support the connection member 50. Thus, welding of the connection member 50 and the terminals 41 and 42 in a state in which the connection member 50 is mounted on the terminals 41 and 42 may be facilitated. Also, the connection member 50 may contact the nuts 47 and the terminals 41 and 42. Thus, the connection member 50 may be electrically connected to the terminals 41 and 42 and the nuts 47, thereby reducing resistance facilitating a stable connection.

Figure 6:
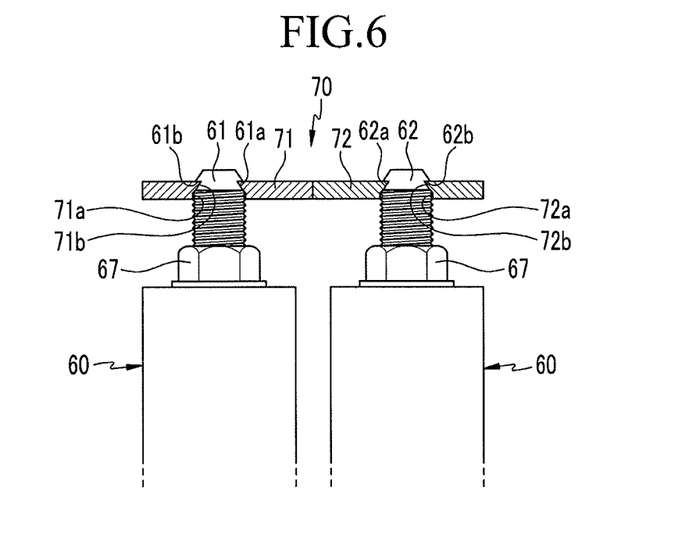
FIG. 6 illustrates a cross-sectional view showing a portion of a battery module according to an embodiment.

FIG. 6 illustrates a cross-sectional view showing a connection member according to an embodiment.

Referring to FIG. 6, a battery module according to the present embodiment may have the same structure as that of the previous embodiment, except for the shape of terminals and a connection member. Accordingly, a repeated description of the same structure and elements may be omitted.

The battery module according to the present embodiment may include a plurality of rechargeable batteries 60 (each having a positive electrode terminal 61 and a negative electrode terminal 62) and a connection member 70 (electrically connecting the rechargeable batteries 60).

Outer circumferences of the positive electrode terminal 61 and the negative electrode terminal 62 may be threaded. Nuts 67 may be respectively installed on the positive electrode terminal 61 and the negative electrode terminal 62 to support the positive electrode terminal 61 and the negative electrode terminal 62 at an upper or lower portion thereof.

The connection member 70 may have a plate shape. In a state in which the positive electrode terminal 61 and the negative electrode terminal 62 are insertedly installed therein, the connection member 70 may be joined or coupled with the positive electrode terminal 61 and the negative electrode terminal 62 through welding.

The connection member 70 may include a first connection bar 71 joined or coupled with a second connection bar 72. The first connection bar 71 may be made of a material that is different from that of the second connection bar 72.

In an implementation, the first connection bar 71 may be made of the same material as that of the positive electrode terminal 61, e.g., aluminum, and the second connection bar 72 may be made of the same material as that of the negative electrode terminal 62, e.g., copper. The first connection bar may be fixed to or coupled with the positive electrode terminal 61 through welding, and the second connection bar 72 may be fixed to or coupled with the negative electrode terminal 62 through welding.

The first connection bar 71 and the second connection bar 72 may be joined, e.g., by having a clad metal structure or through friction stir welding.

The first connection bar 71 may include a terminal hole 71a into or through which the positive electrode terminal 71 may be inserted. A mounting portion 71b may protrude inwardly, e.g., to an interior of the terminal hole 71a. An inner surface of the mounting portion 71b may be sloped. For example, the mounting portion 71b may gradually protrude further in an inward direction from an outer edge of the terminal hole 71a at an upper portion of the terminal hole 71a. The mounting portion 71b may be disposed at an upper portion of the terminal hole 71a. The positive electrode terminal 61 may include a support portion 61a at an upper portion thereof. The support portion 61a may contact the mounting portion 71b, e.g., an inner surface of the mounting portion 71b, to support the mounting portion 71b. An outwardly protruded support projection 61b may be formed at an upper portion of the support portion 61a. The support projection 61b may contact an upper end of the mounting portion 71b. For example, the support portion 61a may have a shape that is complementary to a shape of the mounting portion 71b.

The second connection bar 72 may include terminal hole 72a into or through which the negative electrode terminal 62 may be inserted. A mounting portion 72b may protrude inwardly, e.g., to an inner side of the terminal hole 72a, at the terminal hole 72a. An inner surface of the mounting portion 72b may be sloped. For example, the mounting portion 72b may gradually protrude further in an inward direction from an outer edge of the terminal hole 72a at an upper portion thereof. The mounting portion 72b may be disposed at an upper portion of the terminal hole 72a.

The negative electrode terminal 62 may include a support portion 62a at an upper portion thereof. The support portion 62a may contact the mounting portion 72b, e.g., an inner surface of the mounting portion 72b, to support the mounting portion 72b. An outwardly protruded support projection 62b may be formed at an upper portion of the support portion 62a. The support projection 62b may contact an upper end of the mounting portion 72b. For example, the support portion 62b may have a shape that is complementary to a shape of the mounting portion 72b.

The connection member 70 may be supported by the support portions 61a and 62a (on the upper portions of the terminals 61 and 62) and may be spaced apart from the nuts 67 disposed at lower portions of the terminals 61 and 62.

The support portions 61a and 62a may protrude further than, e.g., above, the connection member 70. For example, upper surfaces of the terminals 61 and 62 may be higher than the upper surface of the connection member 70. Upper ends of the terminal holes 71a and 72a may contact lateral surfaces of the support portions 61a and 62a. A welding portion 75 may join or couple corners of the terminal holes 71a and 72a and lateral surfaces of the support portions 61a and 62a.

When the terminals 61 and 62 are inserted in or through the connection member 70, upper ends of the sloped inner surfaces of the mounting portions 71b and 72b may be mounted on the support portions 61a and 62a after passing through the support projections 61b and 62b. Thus, the support projections 61b and 62b may support upper ends of the mounting portions 71b and 72b at the upper portion thereof. Accordingly, the connection member 70 may be be stably mounted between the support portions 61a and 62a and the support projections 61b and 62b.

As described above, according to the present embodiment, the mounting portions 71b and 72b, the support portions 61a and 62a, and the support projections 61b an 62b may contact one another to thereby support the connection member 70 at upper and lower portions. Thus, welding of the connection member 70 and the terminals 61 and 62 in a state in which the mounting member 70 is mounted on the terminals 61 and 62 may be facilitated.

Figure 7:
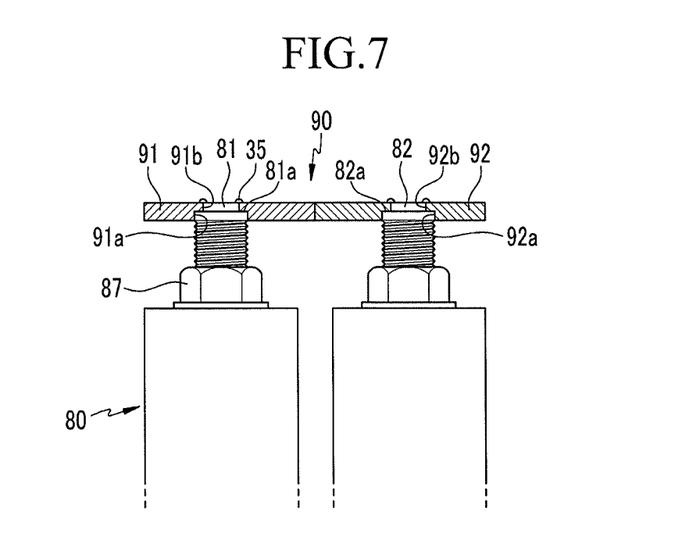
FIG. 7 illustrates a cross-sectional view showing a portion of a battery module according to an embodiment.

FIG. 7 illustrates a cross-sectional view showing a connection member according to an embodiment.

Referring to FIG. 7, a battery module according to the present embodiment may have the same structure as that of the previous embodiment, except for the shape of terminals and a connection member. Accordingly, a repeated description of the same structure and elements may be omitted.

The battery module according to the present embodiment may include a plurality of rechargeable batteries 80 (each having a positive electrode terminal 81 and a negative electrode terminal 82) and a connection member 90 (electrically connecting the rechargeable batteries 80).

Outer circumferences of the positive electrode terminal 81 and the negative electrode terminal 82 may be threaded. Nuts 87 may be respectively installed on the positive electrode terminal 81 and the negative electrode terminal 82 to support the positive electrode terminal 81 and the negative electrode terminal 82 at an upper or lower portion thereof.

The connection member 90 may have a plate shape. In a state in which the positive electrode terminal 81 and the negative electrode terminal 82 are insertedly installed in the connection member 90, the connection member 90 may be joined or coupled thereto through welding.

The connection member 90 may include a first connection bar 91 joined to or coupled with a second connection bar 92.

The first connection bar 91 may be made of a material different from that of the second connection bar 92.

In an implementation, the first connection bar 91 may be made of the same material as that of the positive electrode terminal 81, e.g., aluminum, and the second connection bar 92 is made of the same material as that of the negative electrode terminal 82, e.g., copper. The first connection bar 91 may be fixed to the positive electrode terminal 81 through, e.g., welding, and the second connection bar 92 may be fixed to the negative electrode terminal 82 through, e.g., welding.

The first connection bar 91 and the second connection bar 92 may be joined, e.g., by having a clad metal structure or through friction stir welding.

The first connection bar 91 may include terminal hole 91*a* into or through which the positive electrode terminal 81 may be inserted. A mounting portion 91*b* may protrude inwardly, e.g., to an interior of the terminal hole 91*a*, at the terminal hole 91*a*. The mounting portion 91*b* may be a projection protruding at a right angle, e.g., along a plane of the connection member 90, such that a step is formed at an inner surface of the terminal hole 91*a*. The mounting portion 91*b* may be formed at an upper portion of the terminal hole 91*a*, e.g., a lower end of the terminal hole 91*a* may be wider than the upper portion of the terminal hole 91*a*.

The positive electrode terminal 81 may include a support portion 81*a* at an upper portion thereof. The support portion 81*a* may contact a lower surface of the mounting portion 91*b* to support the mounting portion 91*b*. The support portion 81*a* may take the form of a stepped recess. When the mounting portion 91*b* is inserted into the support portion 81*a*, the upper surface of the support portion 81*a* may contact the lower surface of the mounting portion 91*b* to support the mounting portion 91*b*. For example, the support portion 81*a* may have a shape that is complementary to a shape of the mounting portion 91*b*.

The second connection bar 92 may include a terminal hole 92*a* into or through which the negative electrode terminal 82 may be inserted. A mounting portion 92*b* may protrude inwardly, e.g., to an inner side of the terminal hole 92*a*, at the terminal hole 92*a*. The mounting portion 92*b* may be a projection protruding at a right angle, e.g., along a plane of the connection member 90, such that a step is formed on an inner surface of the terminal hole 92*a*. The mounting portion 92*b* may be formed at an upper portion of the terminal hole 92*a*, and a lower end of the terminal hole 92*a* may be wider than the upper portion of the terminal hole 92*a*.

The negative electrode terminal 82 may include a support portion 82*a* at an upper portion thereof. The support portion 82*a* may contact a lower surface of the mounting portion 92*b* to support the mounting portion 92*b*. The support portion 82*a* may take the form of a stepped recess. When the mounting portion 92*b* is inserted into the support portion 82*a*, the upper surface of the support portion 82*a* may contact the lower surface of the mounting portion 92*b* to support the mounting portion 92*b*. For example, the support portion 82*a* may have a shape that is complementary to a shape of the mounting portion 92*b*.

The connection member 90 may be supported by the support portions 81*a* and 82*a* (on the upper portions of the terminals 81 and 82) so as to be spaced apart from the nuts 87 (disposed at a lower portion of the terminals 81 and 82).

In an implementation, an upper surface of the connection member 90 and upper surfaces of the terminals 81 and 82 may be coplanar. A welding portion 95 may join or couple the terminals 91 and 92 and the connection member 90 along upper corners of the terminal holes 91*a* and 92*a*.

As described above, according to the present embodiment, the mounting portions 91*b* and 92*b* and the support portions 81*a* and 82*a* may contact one another to support the connection member 90. Thus, in a state in which the connection member 90 is mounted on the terminals 81 and 82, welding of the connection member 90 and the terminals 81 and 82 may be facilitated.

By way of summation and review, the electrode terminal of each battery may be fixed to the cap plate by a nut. The nut may be loosened due to continuous external vibration or impact. Thus, contact resistance within the rechargeable battery may increase, thereby degrading an output of the rechargeable battery and shortening a life span of the rechargeable battery.

For example, when the positive electrode terminal is made of aluminum and the negative electrode terminal is made of copper, a connection member and the positive electrode terminal or the negative electrode terminal may be made of different materials. Thus, corrosion may occur or contact resistance may be continuously increased due to contact between the heterogeneous metals.

A method of joining the connection member to the positive electrode terminal and the negative electrode terminal through resistance welding has been considered. However, in such a method, a process of welding the connection member to a terminal threaded to fixedly install a nut may be inconvenient and complicated.

Also, when the connection member is made of a material different from that of the positive electrode terminal and the negative electrode terminal, it may be difficult to join the connection member and the terminals through resistance welding or ultrasonic welding because melting points thereof may be different.

The embodiments provide a battery module that easily and stably fixes a connection member and terminals.

According to an embodiment, the terminals and the connection member may be easily welded, and contact resistance and corrosion may be advantageously reduced, thereby enhancing an output and a life span of the battery module.

The embodiments provide a battery module having an improved structure of electrically connecting rechargeable batteries.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of rechargeable batteries each having terminals; and
   a connection member electrically connecting terminals of neighboring ones of the rechargeable batteries,
   wherein the connection member includes:
   a terminal hole into which one of the terminals is inserted, and
   a mounting portion that protrudes inwardly at the terminal hole, and wherein each terminal includes a support portion contacting the mounting portion and supporting the mounting portion; wherein the terminals include a first terminal including a first material and a second terminal including a second material; and a first connection bar formed of the first material, the first connection bar being connected the first terminal; and a second connection bar formed of the second material, the second connection bar being connected to the second terminal.

2. The battery module as claimed in claim 1, wherein the first material includes aluminum.

3. The battery module as claimed in claim 1, wherein the second material includes copper.

4. The battery module as claimed in claim 1, wherein the first material and second material are different materials.

5. The battery module as claimed in claim 1, wherein the terminal hole has a lower end that is wider than an upper end thereof.

6. The battery module as claimed in claim 1, wherein the mounting portion gradually protrudes further inwardly toward an upper portion thereof.

7. The battery module as claimed in claim 1, wherein:
the mounting portion has an inner surface that is sloped with respect to an upper surface of the connection member, and
a surface of the support portion contacting the inner surface of the mounting portion is sloped.

8. The battery module as claimed in claim 1, wherein:
the support portion has a stepped recess, and
the mounting portion includes a stepped protrusion protruding from an inner side of the terminal hole, a lower surface of the mounting portion contacting an upper surface of the support portion.

9. The battery module as claimed in claim 1, further comprising a nut on each of the terminals, the connection member being spaced apart from the nut.

10. The battery module as claimed in claim 1, wherein the support portion includes an outwardly protruded support projection at an upper portion thereof, the support protrusion contacting an upper surface of the mounting portion.

11. The battery module as claimed in claim 1, wherein an upper surface of the connection member is coplanar with an upper surface of each of the terminals.

12. The battery module as claimed in claim 1, further comprising a welding portion at a junction of each of the terminals and an upper end of the terminal hole.

13. The battery module as claimed in claim 1, further comprising a welding portion at a junction of each of the terminals and an upper corner of the terminal hole.

* * * * *